United States Patent
Kabasin et al.

(10) Patent No.: US 9,587,604 B2
(45) Date of Patent: Mar. 7, 2017

(54) METHOD FOR CONTROLLING A FUEL HEATER

(71) Applicant: DELPHI TECHNOLOGIES, INC., Troy, MI (US)

(72) Inventors: Daniel F. Kabasin, Rochester, NY (US); Jason C. Short, Webster, NY (US)

(73) Assignee: Delphi Technologies, Inc., Troy, MI (US)

( * ) Notice: Subject to any disclaimer, the term of this patent is extended or adjusted under 35 U.S.C. 154(b) by 351 days.

(21) Appl. No.: 14/219,295

(22) Filed: Mar. 19, 2014

(65) Prior Publication Data

US 2015/0267671 A1   Sep. 24, 2015

(51) Int. Cl.
| | |
|---|---|
| H05B 1/02 | (2006.01) |
| F02M 53/02 | (2006.01) |
| F02M 31/125 | (2006.01) |
| F02M 53/06 | (2006.01) |
| F02N 19/04 | (2010.01) |
| F02D 41/06 | (2006.01) |
| F02D 41/22 | (2006.01) |
| F02D 41/20 | (2006.01) |

(52) U.S. Cl.
CPC .......... *F02M 53/02* (2013.01); *F02M 31/125* (2013.01); *F02M 53/06* (2013.01); *F02N 19/04* (2013.01); *F02D 41/064* (2013.01); *F02D 41/221* (2013.01); *F02D 2041/2034* (2013.01); *F02D 2041/2048* (2013.01); *Y02T 10/126* (2013.01)

(58) Field of Classification Search
CPC .... H05B 3/0014; H05B 3/0028; F02M 53/02; F02M 53/06; F02M 31/125
See application file for complete search history.

(56) References Cited

U.S. PATENT DOCUMENTS

2005/0029250 A1* 2/2005 Niwa ................. F02D 41/1494
219/494
2011/0276252 A1* 11/2011 Kabasin ................. F02M 53/06
701/103

* cited by examiner

*Primary Examiner* — Brian Jennison
(74) *Attorney, Agent, or Firm* — Joshua M. Haines

(57) ABSTRACT

A method for controlling electrical power applied to a fuel heater includes applying power to the heater, determining a value for an electrical parameter that varies as a function of the temperature of the heater, and determining a value representative of the time rate of change of the electrical parameter. The method further includes determining the value of the electrical parameter corresponding to a change in the time rate of change of the electrical parameter, wherein the change in the time rate of change of the electrical parameter exceeds a predetermined threshold, and controlling electrical power applied to the heater so as to maintain the temperature of the heater about a target temperature that is a predetermined level below the heater temperature at the time at which said change in the time rate of change of the electrical parameter exceeds the predetermined threshold.

8 Claims, 5 Drawing Sheets

METHOD FOR CONTROLLING A FUEL HEATER

TECHNICAL FIELD OF INVENTION

The invention generally relates to heated fuel injectors, and more particularly relates to a system for controlling the temperature of a heater in a heated fuel injector.

BACKGROUND OF THE INVENTION

It is known that heating fuel consumed by an internal combustion engine during a cold start, particularly fuel comprising alcohol, enables cold starting of the engine at ambient temperatures below fuel vaporization temperatures, and reduces hydrocarbon (HC) and carbon monoxide (CO) emissions. The Society of Automotive Engineers publications entitled *Heated Injectors for Ethanol Cold Starts* (SAE 2009-01-0615) by Daniel Kabasin et al. and *Emission Reduction with Heated Injectors* (SAE 2010-01-1265) by Daniel Kabasin et al., the entire contents of each of which are hereby incorporated herein by reference, document the benefits of using heated fuel injectors to enable low ambient cold starting of engines and to reduce engine emissions.

The temperature control of such heated injectors may use an open loop approach that regulates power to a heater element based on extensive empirical testing of output fuel temperatures for various fuel flow rates, ambient temperatures, coolant temperatures, elapsed time from initiation of crank, and estimated fuel flow rates. The open-loop temperature control is supposed to keep the heater element temperature below a maximum failure temperature of the heater element, below a melting temperature of a protective plastic covering the heater element, and below the boiling temperature of the fuel resident in the injector. This open-loop control also considers manufacturing variation of heater resistances and so requires a safety margin in the power applied to the heaters in order to avoid vapor lock or damage due to excessive heating. Consequently, the open-loop approach may result in less than optimal heating of the fuel and/or failed cold starts.

An alternative to open loop control of heated injectors is to incorporate a temperature sensing means in the fuel injector, as disclosed in commonly owned U.S. Pat. No. 8,439,018, the entire disclosure of which is hereby incorporated herein by reference. While this approach can result in improved temperature control, the addition of the temperature sensing means increases the cost and complexity of the injector and its control system.

BRIEF SUMMARY OF THE INVENTION

In accordance with an embodiment of the invention, a method of controlling power applied to a heater in a fuel injector is provided. The method includes the steps of applying electrical power to the heater, and determining a value of an electrical parameter that varies as a function of the temperature of the heater. A value representative of the time rate of change of the electrical parameter is determined. When an inflection point, defined as a change in the time rate of change that exceeds a predetermined threshold, is recognized in the time rate of change of the electrical parameter, the value of the electrical parameter is captured. Power to the heater is then controlled to maintain the heater temperature at a predetermined level below the temperature corresponding to the value of the electrical parameter at the inflection point.

In another embodiment of the invention, a controller for operating a heated fuel injector is provided. The controller includes means for supplying power to a heater and means for measuring an electrical parameter that varies as a function of the temperature of the heater. The controller further includes means for determining the time rate of change of the electrical parameter and for determining a change in the time rate of change of the electrical parameter. The controller is configured to control power to the heater to maintain the heater temperature at a level below a level corresponding to a change in the time rate of change of the electrical parameter that exceeds a predetermined value.

BRIEF DESCRIPTION OF THE DRAWINGS

The present invention will now be described, by way of example with reference to the accompanying drawings, in which.

DETAILED DESCRIPTION OF THE INVENTION

Figure 1:
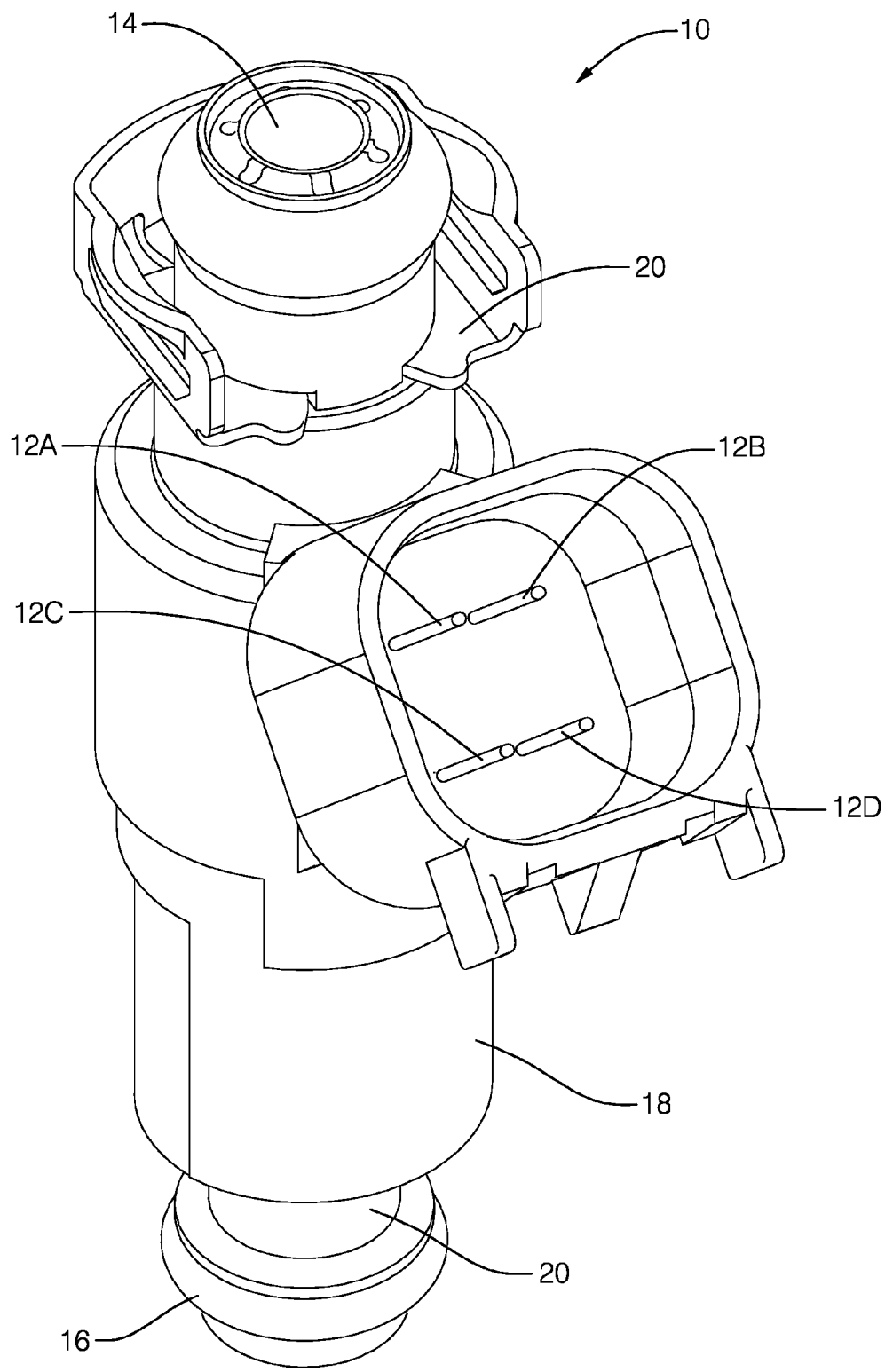
FIG. 1 is a perspective view of a heated fuel injector suitable for use with an embodiment of the invention.

In accordance with an embodiment of a heated fuel injector system, FIG. 1 illustrates an exemplary heated fuel injector 10 having four connector pins 12a, 12b, 12c, and 12d, a fuel inlet end 14, a fuel dispensing end 16, and a shell 18 overlying a fuel injector body 20. Typically, the heated fuel injector 10 would be attached to an internal combustion engine, the fuel inlet end 14 would be coupled to a source of pressurized fuel, and the fuel dispensing end 16 would be positioned so fuel passing through the body 20 would be dispensed by the heated fuel injector 10 to be utilized by the engine to operate the engine. By way of a non-limiting example, connector pins 12a and 12b may be coupled to an actuation coil 42 (shown schematically in FIG. 3) within the body 20 of the heated fuel injector 10 that operates a valve (not shown) also within the body 20 and generally located at the fuel dispensing end 16. Continuing with the example, if a voltage is applied across connector pins 12a and 12b, the valve may open to allow fuel to flow from the fuel inlet end 14, through the body 20, and out of the fuel dispensing end 16. When the voltage is removed or actively forced to zero volts, the valve may close and stop or obstruct the flow of fuel. By controlling the voltage applied to the connector pins 12a and 12b, the heated fuel injector 10 may be operated to controllably dispense the fuel.

Figure 2:
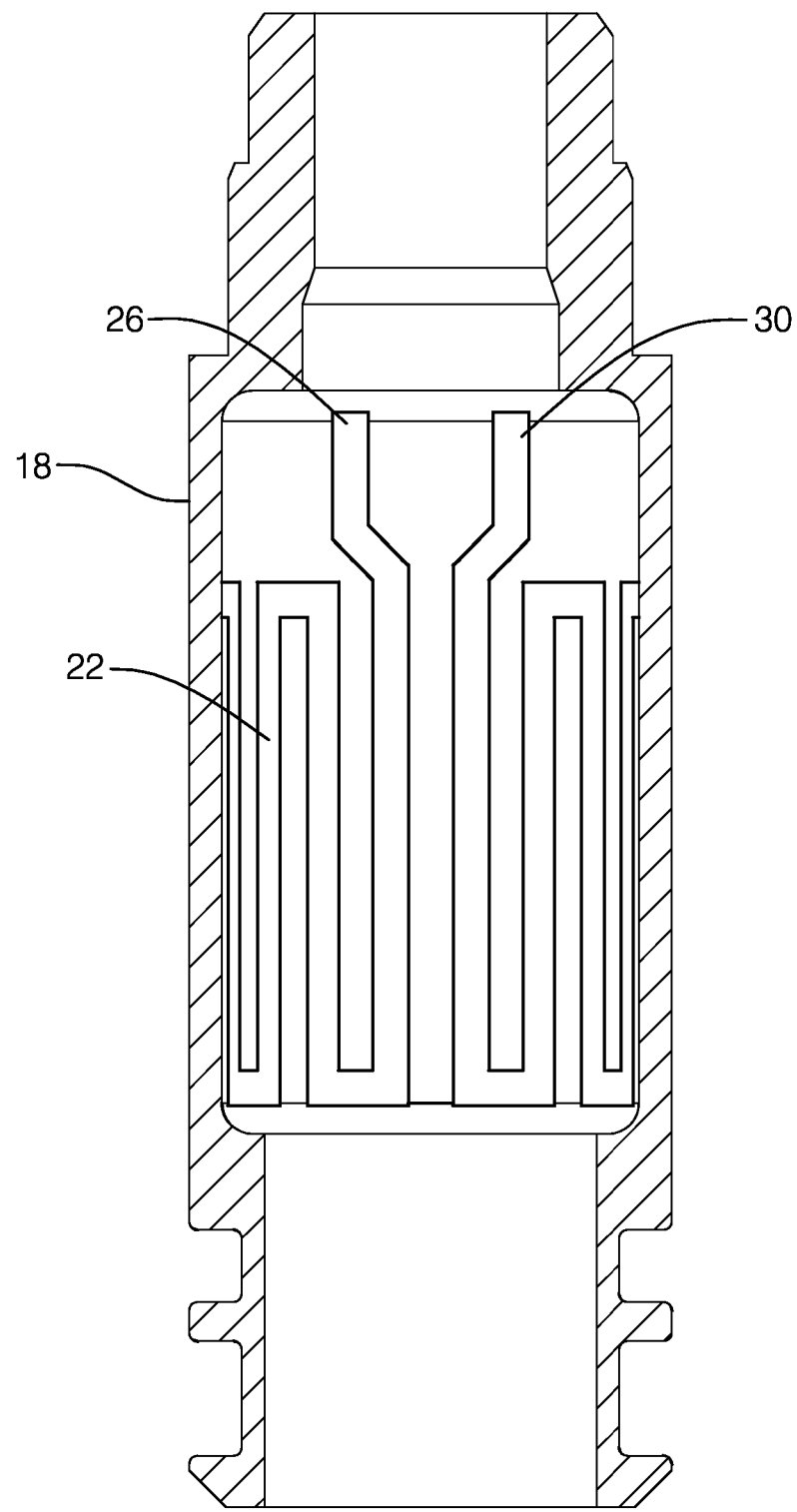
FIG. 2 is a cut-away view of part of the heated fuel injector in FIG. 1 suitable for use with an embodiment of the invention.

FIG. 2 illustrates cut-away view of the shell 18 with the body 20 removed. A heater element 22 formed of electrically conductive material is arranged to heat the fuel within the body 20 so that heated fuel may be dispensed by the heated fuel injector 10. The heater element 22 exhibits a heater resistance so that as electric current flows through the heater element 22 heat is generated that increases a heater temperature and thereby heats the heater element 22 and increases a fuel temperature. An exemplary non-limiting value of the resistance of the heater element 22 is nominally 0.3 Ohms at 20° C. When the heated fuel injector 10 is assembled, the heater element 22 is suitably thermally coupled to the body 20 to be effective to heat fuel passing through the body 20. The heater element 22 may be formed, for example, of thick-film resistive material that may be applied to the exterior of the body 20, or applied to the interior of the shell 18. Alternately, the heater element 22 may be formed of metal foil or wire that is suitably arranged to heat the fuel injector body 20 and thereby heat the fuel passing through the heated fuel injector 10. The connection points 26 and 30 on heater element 22 may be connected to the connector pins 12c and 12d by soldering or other known methods.

Figure 3:
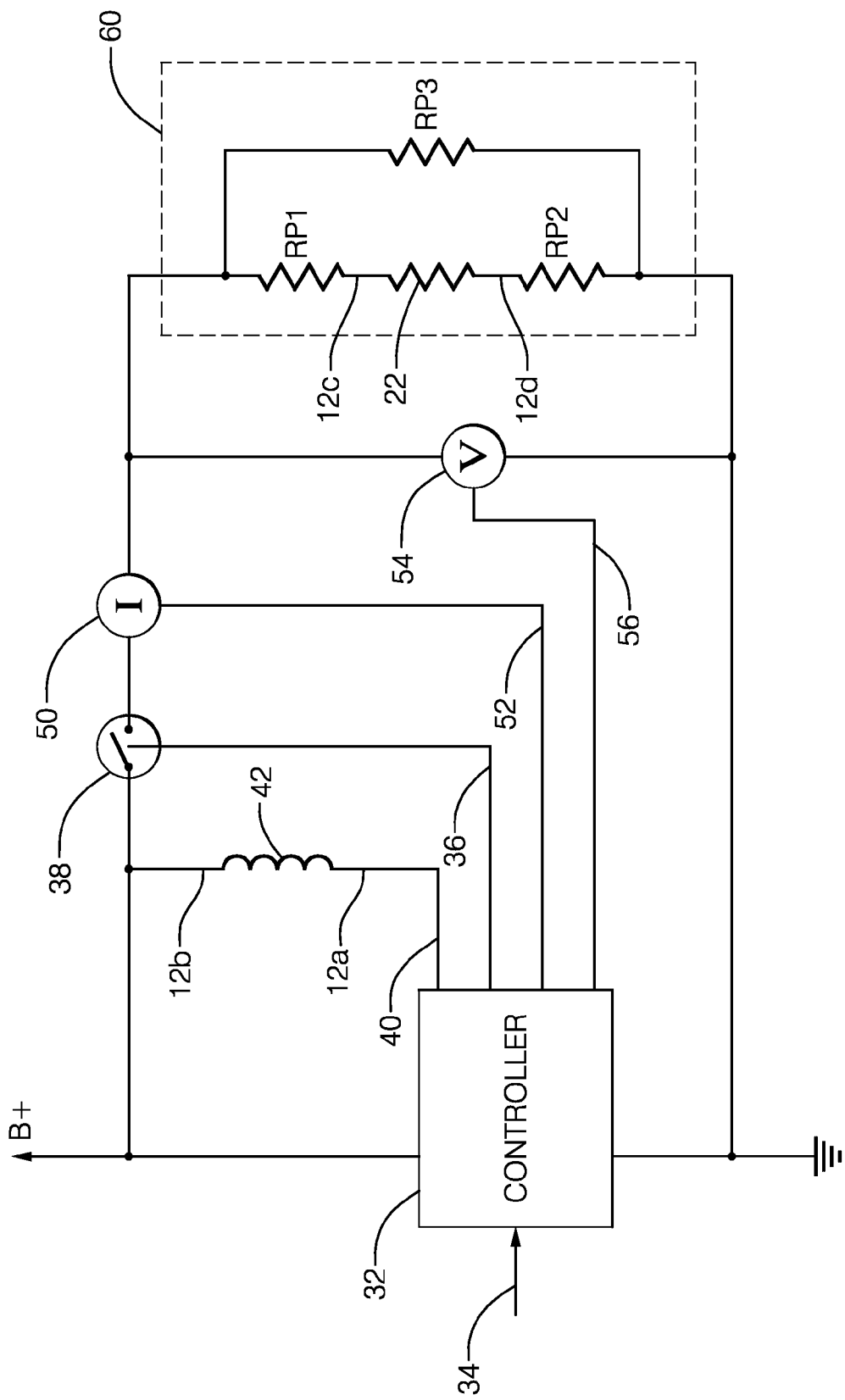
FIG. 3 is a circuit diagram of a heated fuel injector system for operating the heated fuel injector in FIG. 1 in accordance with an embodiment of the invention.

FIG. 3 illustrates a circuit diagram useful for describing the operation of an embodiment of the heated fuel injector system. The system may include a controller 32 configured to regulate electric power to the heater element 22. The controller 32 may output a power control signal 36 that is effective to open and close a power switch 38 and thereby modulate power to the heater element 22. The power switch 38 is illustrated as a mechanical switch. However, it is understood that the power switch 38 may suitably be a relay or a solid state switch such as a transistor. In one embodiment the controller 32 may pulse width modulate or frequency modulate the power switch control signal 36 to regulate the heating power supplied to the heater element 22 and thereby control the temperature of the heater element 22. Alternately, the power switch 38 may be a transistor that is operated in a linear mode by the control signal 36.

As illustrated in FIG. 3, the controller may also provide a control line 40 connected to the actuation coil 42 to control current through the actuation coil 42, thereby controlling fuel delivery from the fuel injector 10.

The controller 32 may include a microprocessor or other control circuitry as would be evident to those skilled in the art. The controller 32 may include memory, including non-volatile memory, such as electrically erasable programmable read-only memory (EEPROM) for storing one or more routines, thresholds and captured data. The one or more routines may be executed by the microprocessor to generate the switch control signal 36. The controller 32 and other components shown in FIG. 3 may be integrated within the heated fuel injector 10 so the heated fuel injector 10 may operate in an autonomous manner, independent of the engine control system.

The controller 32 may receive a temperature signal 34. The temperature signal 34 may be indicative of a fuel temperature, an air temperature, an engine coolant temperature, or any other temperature that may be useful in influencing the control of the heater temperature. The controller 32 may provide a time-out function that can give this heated fuel injector 10 additional stand-alone capability whereby the controller 32 determines to connect the heater element 22 to electrical power based on the temperature signal 34. For example, the controller 32 may only supply electrical power to the heater element 22 if the temperature signal 34 indicates that the temperature is below 30° C. The controller 32 may also include programming to disconnect the heater element 22 after a pre-determined time following either being initially energized or following the energizing of an injector actuator coil.

FIG. 3 further includes a current determining means 50 configured to communicate with the controller 32 via a current signal 52. The current determining means 50 is configured to determine the amount of electrical current flowing through the heater 22. In a non-limiting embodiment the current determining means 50 may include a shunt resistor in series with the heater 22 and a means to measure the voltage across the shunt resistor, in order to determine the level of current flowing through the heater 22 as the ratio of the voltage across the shunt resistor to the resistance of the shunt resistor. In another non-limiting embodiment, the current determining means 50 may be a current sensor, for example a Hall-effect sensor, for direct measurement of the current flowing through the heater 22. In yet another non-limiting embodiment, the current determining means 50 may be a current source configured to provide an electrical current at a predetermined level to the heater 22, with the predetermined current level controlled by the controller 32.

FIG. 3 also includes a voltage determining means 54 configured to communicate with the controller 32 via a voltage signal 56. The voltage determining means 54 is configured to measure the voltage across a heater circuit 60. The controller 32 may be configured to perform mathematical manipulation of the voltage determined by the voltage determining means 54 and/or the current determined by the current determining means 50. For example, the voltage determined by the voltage determining means 54 may be divided by the current determined by the current determining means 50 to calculate the electrical resistance of the heater circuit 60.

In actual practice, the heater circuit 60 may include the heater resistance 22 in series with parasitic resistances RP1 and RP2 and in parallel with leakage resistance RP3. Parasitic resistance RP1 and RP2 includes the resistance of wires and connectors that are necessary to make electrical connection to the heater 22 at connection points 12c and 12d. Ideally parasitic resistances RP1 and RP2 are of low ohmic resistance value relative to the resistance of the heater 22, but in practice the effects of RP1 and RP2 may not be negligible. Similarly, the leakage resistance represented by RP3, which may result for example from degraded insulation in the wires and connectors that are necessary to make electrical connection to the heater 22, is ideally high relative to the resistance of the heater 22, but in certain circumstances it may be of low enough ohmic resistance value to be significant.

According to an embodiment of the invention, the heater 22 is made of a material that has a non-zero temperature coefficient of resistance (TCR), meaning that the electrical resistance of the heater varies with the temperature of the heater. The resistance of the heater as a function of temperature can be approximated mathematically by the equation:

$$R(T)=R_0(1+\alpha T) \quad \text{(Equation 1)}$$

In Equation 1, R(T) represents the resistance at temperature T in degrees C., $R_0$ represents the resistance at a temperature of zero degrees C., and a represents the TCR in (degrees C.)$^{-1}$. The value of the term $R_0$ depends on the conductivity of the resistor material and the geometry (width, length, thickness) of the resistor, while the value of the term a is a function of the resistor material. More accurate approximations of the relationship between resistance and temperature may include higher order terms to more accurately model the properties of the resistor material. For example, a second order term may be included to yield the equation:

$$R(T)=R_0(1+\alpha T+\beta T^2) \quad \text{(Equation 2)}$$

The terms α and β in Equations 1 and 2 may be determined experimentally by measuring resistance and temperature across a temperature range of interest and using curve fitting to find values for α and β.

In controlling the heater of a heated fuel injector, it may be useful to know the temperature of the heater. Attempts have been made to use the resistance vs. temperature relationship as described for example by Equation 1 or Equation 2 to directly determine the heater temperature from a measured resistance value, knowing the geometry-dependent and material-dependent coefficients $R_0$, α, and β. If the temperature of the heater 22 can be determined, a control strategy may be to control the electrical power to the heater 22 so as to maintain the heater 22 at a desired temperature. However, there are several factors that make the determination of heater temperature difficult. Referring to FIG. 3, it will be appreciated that the voltage determined by voltage determining means 54 can be divided by the current determined by current determining means 50 to calculate the resistance of the heater circuit 60. However, as indicated in FIG. 3, the heater circuit 60 may include the heater resistance 22 in series with parasitic resistances RP1 and RP2 and in parallel with leakage resistance RP3. Even if the leakage resistance RP3 is of a high enough resistance value to be negligible, the total resistance determined by a circuit as shown in FIG. 3 will be:

$$R_{total} = RP1 + R_{heater} + RP2; \text{ or}$$

$$R_{total} = RP1 + R_0(1 + \alpha T + \beta T^2) + RP2 \quad \text{(Equation 3)}$$

It will be appreciated that the total resistance $R_{total}$ of the heater circuit 60 varies as a function of the heater temperature T. If the heater resistance is high relative to the parasitic resistances RP1 and RP2, the parasitic resistances can be neglected, and the entire measured resistance may be considered the heater resistance. In a practical heated fuel injector, the heater resistance may be on the order of 0.3 ohms, which is comparable in magnitude to resistances that may be present in wiring and in connector interfaces. Additionally, the resistances RP1 and RP2 may have their own effective TCR values α and β, and are likely to be at different temperatures than the temperature of the heater.

Even if the resistances RP1 and RP2 could be totally accounted for, it has been discovered that in practice another difficulty is encountered when trying to accurately determine the heater temperature T from a measured resistance value $R_{total}$. Equations 1 and 2 above, which attempt to model the resistance vs. temperature of the heater 22, assume that the entire heater is at the same temperature. In actuality, temperature gradients may exist across the extent of the heater. In particular, it has been determined that as the heater temperature approaches the boiling point of the fuel that is being heated, localized boiling may occur at specific locations on the heater. Without being bound by theory, it is believed that at heater locations where boiling initiates, the fact that it is fuel vapor rather than liquid fuel that is in contact with the heater at those specific locations results in decreased heat transfer from the heater to the fuel at those locations. With the same electrical power density (e.g. in watts per unit area) delivered to those locations, but with decreased heat transfer to the fuel, the temperature at those locations will increase more than at heater locations in contact with liquid fuel, resulting in localized thermal runaway and hot spots. In actual testing, thermal imaging of a heater surface has shown localized temperatures in excess of 260° C., even though the measured resistance of the heater indicated a resistance value corresponding to a heater temperature of about 160° C. if the entire heater was isothermal, that is, at the same temperature.

If a heater 22 is operated with extreme localized temperature, damage may occur to the heated fuel injector 10. The heater material and/or materials in contact with the heater may degrade. The base resistance and/or TCR ($R_0$, α, β) may permanently shift, resulting in subsequent errors when trying to control the heater 22 based on a measured resistance value. Additionally, when internal boiling occurs there is a possibility of vapor being injected instead of or in addition to liquid fuel. This can result in enleaning the fuel delivery, as the injector is not designed to meter fuel vapor.

Figure 4:
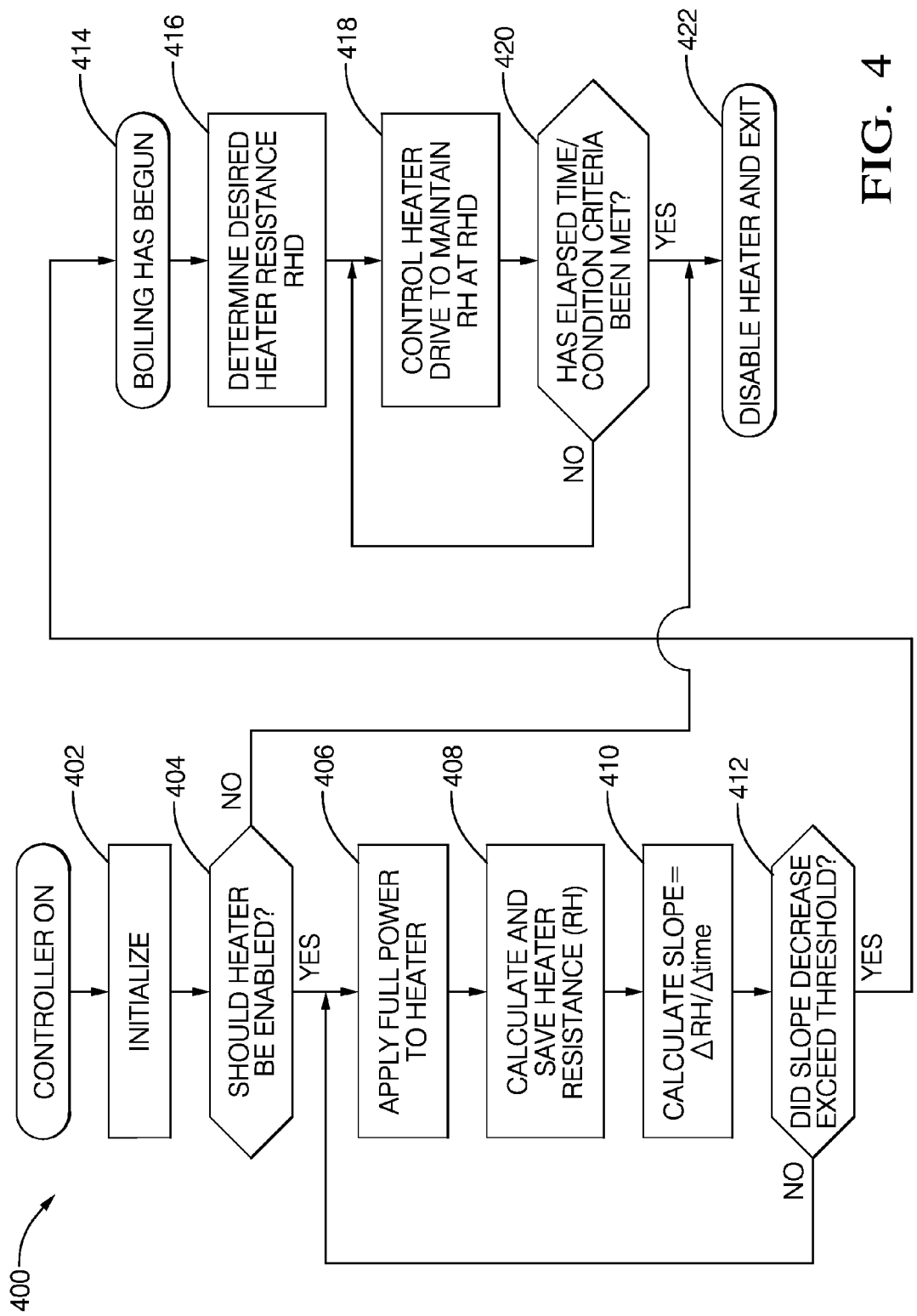
FIG. 4 is a flow chart of a method that includes elements of the invention.

In accordance with the present invention, an exemplary method 400 for controlling a heater 22 in a heated fuel injector 10 is described in the flowchart of FIG. 4. In step 402, the controller performs any necessary initialization tasks. In step 404, the controller determines if conditions are such that the heater should be enabled. This determination in step 404 may include determining if the ambient temperature is below a certain level and/or determining if the engine coolant temperature is below a certain level. If the determination in step 404 is that the heater should not be enabled, the algorithm proceeds to step 422, where the heater is disabled and the algorithm exits.

If the determination in step 404 is that the heater should be enabled, the algorithm proceeds to step 406, where full power is applied to the heater 22. The algorithm then proceeds to step 408, where the resistance RH of the heater circuit 60 is determined and saved. This resistance may be determined by dividing the current determined by the current determining means 50 into the voltage determined by the voltage determining means 54. It will be appreciated that the resistance RH includes the resistance of the heater 22 as well as the influences of parasitic resistances RP1 and RP2 and leakage resistance RP3.

In step 410, the slope of the resistance vs. time characteristic of the heater circuit is determined as the change in indicated resistance RH since a previous determination of RH divided by the elapsed time since the previous determination of RH. It will be appreciated that the slope of the resistance vs. time characteristic may alternatively be referred to as the time rate of change of the resistance, or as the derivative of the resistance with respect to time.

It has been observed that the slope of the RH vs. time characteristic typically decreases as the heater is initially powered up. The heater 22 has a positive temperature coefficient of resistance (TCR). As the heater warms up and its temperature increases, the resistance RH also increases. The power delivered to the heater circuit depends on the voltage across the heater VH and the resistance of the heater circuit RH according to the relationship Power=$VH^2$/RH. Because the heater is being driven by essentially a constant voltage, the power delivered to the heater decreases as the heater warms up and RH increases. Assuming constant heat transfer from the heater to its surroundings, the rate of temperature increase of the heater decreases with time due to the decreased power delivery to the heater due to its increased resistance. Additionally, as the heater increases the temperature of fuel with which the heater is in contact, convection currents may be induced in the fuel, raising heat transfer from the heater to the fuel and slowing the rate of temperature rise of the heater.

As the heater temperature increases to the point where boiling first occurs, the slope of the resistance vs. time characteristic undergoes a sharp reduction. At the inception of boiling, latent heat energy is absorbed to allow the fuel to change from liquid phase to vapor phase. While this phase change is underway, the fuel temperature is essentially constant, at the boiling point of the fuel being vaporized.

In step 412, the slope of the resistance vs. time characteristic is compared to a predetermined threshold value which is indicative of fuel boiling. If the slope has not decreased to an extent that would indicate boiling, the algorithm returns to step 406. If the slope has decreased to an extent that indicates boiling, the algorithm proceeds to the branch commencing at step 414.

In step 416, a desired heater resistance RHD is determined. The desired heater resistance RHD is preferably set to a value below the value of RH at the time the onset of boiling was detected, i.e., at the time of the slope change exceeding the predetermined threshold. It will be appreciated that by controlling the electrical power applied to the heater 22 so that its resistance RH is below the value of RH at the onset of boiling, the temperature of the heater 22 will be maintained at a temperature below the temperature of the heater that results in boiling of the fuel. By setting RHD below but close to the value of RH at the onset of boiling, fuel heating can be maximized without sustaining boiling that can result in damage to the heated fuel injector 10 or in leaner than desired fuel delivery as described earlier.

In step 418, electrical power to the heater is controlled in a closed loop fashion to maintain RH at the desired value RHD. In an exemplary embodiment, voltage supplied to the heater 22 may be pulse width modulated by the controller 32, supplying a control signal 36 to the switch 38. The duty cycle of the control signal 36 may be varied to control the temperature of the heater 22 and thereby to control the resistance RH of the heater circuit 60. The duty cycle of the control signal 36 may be determined using a PID (proportional-integral-derivative) control scheme to minimize the error between RH and RHD, as is known in the art.

In step 420, the algorithm determines if elapsed time and/or other conditions call for the heater to be turned off. If not, the algorithm loops back to step 418 and closed loop control of RH continues. If it is determined that the heater has been on long enough, based on elapsed time and/or other conditions such as a temperature measurement, the algorithm proceeds to step 422, where the heater is disabled and the algorithm exits.

Figure 5:
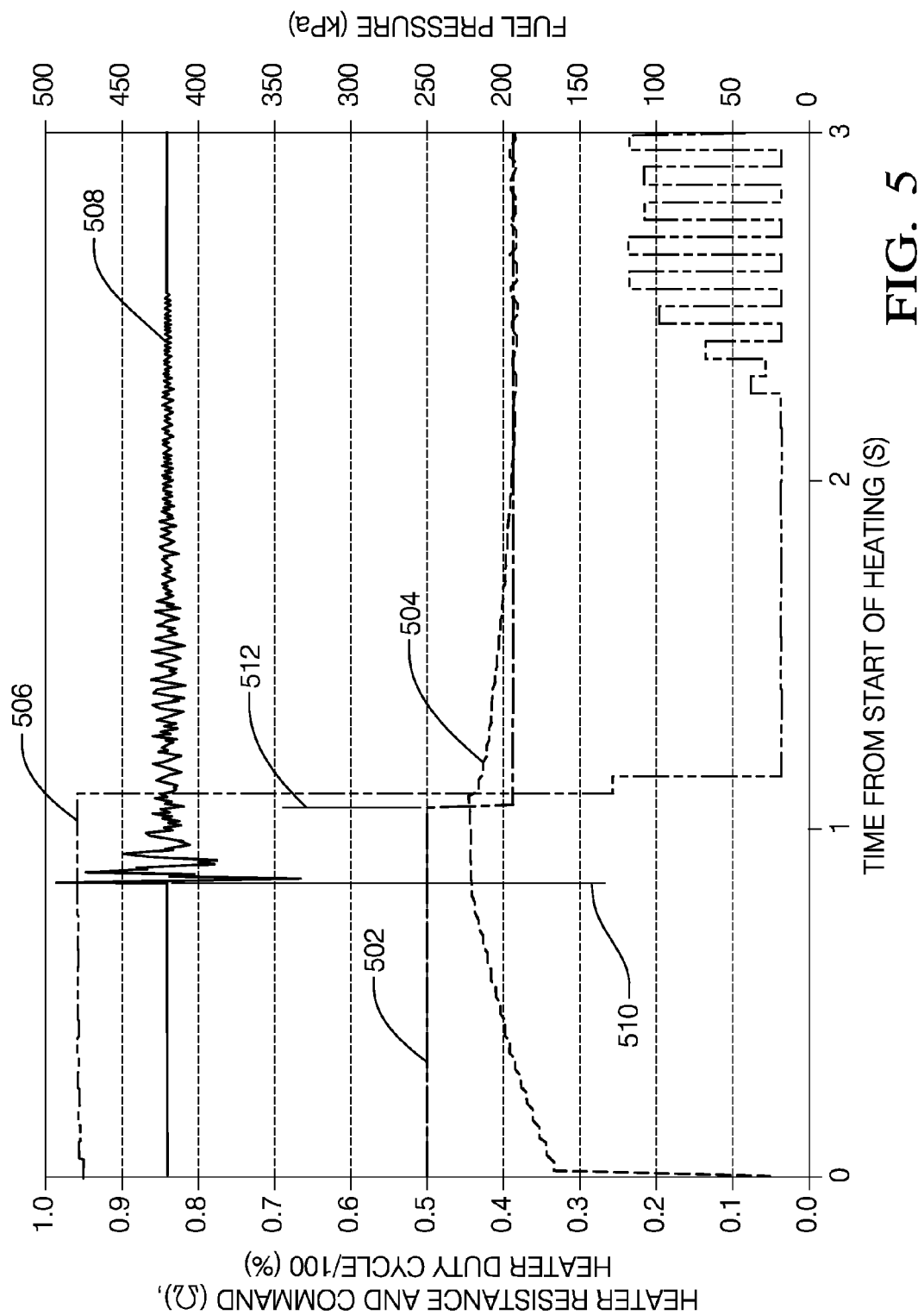
FIG. 5 is a graph of heater resistance vs. time that illustrates elements of the invention.

FIG. 5 is a chart which illustrates aspects of the present invention. In FIG. 5, trace 502 represents a desired heater resistance RHD. In the exemplary algorithm whose results are depicted in FIG. 5, RHD is initially set to a value of 0.5 ohms. While this value is known to be unrealistically high for the heater used in this example, setting RHD to such a high value forces the initial error between the actual heater resistance RH (shown in trace 504) and the desired heater resistance RHD in trace 502 to be such that the electrical power applied to the heater is maximized, thereby assuring rapid warm-up of the heater. In the example depicted in FIG. 5, heater power is controlled by pulse-width modulation (PWM) of a voltage applied to the heater. Trace 506 depicts the duty cycle (i.e. pulse high time divided by total (high+low) time). In the example shown in FIG. 5, the duty cycle of the PWM heater drive signal ranges from a maximum of 96% to a minimum of 4%, with each pulse having a total (high+low) time of 50 milliseconds. Trace 506 is plotted against the scale axis on the left side of FIG. 5, scaled such that a 4% duty cycle is plotted as a value of 0.04 and a 96% duty cycle is plotted as a value of 0.96.

FIG. 5 also includes a pressure trace 508, plotted against the scale on the right side of the chart. While pressure information may not be required to practice the present invention, the pressure trace 508 is included to assist in understanding how the onset of boiling is recognized using the electrical signals that are used.

With continued reference to FIG. 5, maximum power, in this case application of voltage at 96% duty cycle shown by trace 506, is initiated at time=0. Upon application of power the heater circuit resistance RH (trace 504) shows an initial slope after power is applied, indicating a rate at which the resistance of the heater circuit is increasing as the temperature of the heater increases. As time proceeds up to the time indicated in FIG. 5 as vertical line 510, downward curvature, i.e. gradually decreasing slope, can be seen in the resistance trace 504, due to the effects of increasing resistance and/or of convection currents in the fuel discussed above.

Continuing to refer to FIG. 5, at the time indicated by vertical line 510 the slope of the resistance trace 504 decreases significantly compared to the slope value prior to the time corresponding to the vertical line 510. Referring to the pressure trace 508, it can be seen that the fuel pressure shows significant fluctuation beginning at the time corresponding to the vertical line 510. The fluctuation in the pressure trace 508 corresponds to the onset of boiling of fuel, and this onset of boiling is evident from the resistance trace as a significant change in the slope of the resistance vs. time characteristic 504.

It will be appreciated that by the very nature of rate of change with respect to time, a certain amount of time must elapse before a change in slope can be recognized. Additional delay in recognizing a slope change may result from filtering that may be applied to the calculated resistance signal. At the time indicated in FIG. 5 by vertical line 512, the control algorithm has recognized that the slope of the resistance vs. time trace 504 has decreased beyond a predetermined threshold, and the desired resistance RHD (trace 502) is decreased from its initial value to a new value that is calculated based on the resistance RH at the time the slope change is recognized. In a preferred embodiment of the invention, the final value of the desired heater resistance RHD is calculated as a predetermined percentage of the value of the resistance of the heater circuit RH measured at the time at which the change in slope of RH vs. time is recognized.

When the desired resistance RHD is changed at the time corresponding to vertical line 512, the error between RH and RHD causes the algorithm to change the duty cycle of the heater drive voltage (trace 506) to a minimum value. Advantageously the minimum duty cycle applied to the heater is non-zero (4% in the example shown), so as to apply voltage to the heater periodically to allow the resistance RH to be determined as the ratio of voltage to current, but at a low enough duty cycle so as to not supply significant energy to the heater.

As seen in FIG. 5, after the desired resistance RHD (trace 502) has been decreased at the time indicated by the vertical line 512, the heater resistance RH (trace 504) decreases as the heater cools due to the reduction in heater drive duty cycle (trace 506). As RH cools to approach RHD, the algorithm controls the duty cycle 506 to control the temperature of the heater so as to minimize the error between RH and RHD. As evidenced by the pressure trace 508, the pressure disturbances associated with boiling subside as RH is controlled based on the calculated RHD, indicating that boiling has subsided.

In the preceding examples, the resistance of the heater circuit 60, determined as the ratio of the voltage determined by the voltage determining means 54 and the current determined by the current determining means 50, was used to represent an electrical parameter that varies as a function of the temperature of the heater 22. It will be appreciated that other electrical parameters may be used in the practice of the present invention without requiring the resistance to be determined. For example, the conductance (reciprocal of the resistance) of the heater circuit 60 may be used as the electrical parameter that varies as a function of the temperature of the heater 22. In another non-limiting example, the current determining means 50 may comprise a current source configured so as to deliver a constant current to the heater circuit 60, and the voltage measured by voltage determining means 54 may be used as the electrical parameter that varies as a function of the temperature of the heater 22. In still another non-limiting example, the current determining means 50 may comprise a current source that is controlled so as to maintain a fixed voltage across the heater circuit 60, and the current used as the electrical parameter that varies as a function of the temperature of the heater 22.

In accordance with an aspect of the invention, several advantages related to control of the heater of a heated fuel injector may be achieved. Fuel heating may be accomplished while minimizing the risk of damage to the heated fuel injector caused by localized hot spots and minimizing the risk of vapor being injected instead of or in addition to liquid fuel. Precise heater control can be performed without requiring precise determination of heater characteristics such as base resistance and temperature coefficient of resistance. Additionally, it is not necessary to precisely know the values of parasitic resistances such as wiring and connector resistances, either at initial installation or as the parasitic resistances change over time.

While this invention has been described in terms of the preferred embodiments thereof, it is not intended to be so limited, but rather only to the extent set forth in the claims that follow.

We claim:

1. A method for controlling electrical power applied to a fuel heater, the method comprising the steps of:
   applying power to the heater,
   determining a value for an electrical parameter that varies as a function of the temperature of the heater,
   determining a value representative of the time rate of change of the electrical parameter,
   determining a value of the electrical parameter corresponding to a change in the time rate of change of the electrical parameter, wherein said change in the time rate of change of the electrical parameter exceeds a predetermined threshold, and
   controlling electrical power applied to the heater so as to maintain the temperature of the heater about a target temperature that is a predetermined level below the heater temperature at the time at which said change in the time rate of change of the electrical parameter exceeds the predetermined threshold.

2. The method of claim 1, wherein the electrical parameter that varies as a function of the temperature of the heater is the resistance of an electrical circuit that includes the heater.

3. The method of claim 1, wherein the step of controlling electrical power applied to the heater so as to maintain the temperature of the heater about a target temperature comprises the steps of:
   calculating a desired value for the electrical parameter, wherein said desired value is based on the value of the electrical parameter when the change in the time rate of change of the electrical parameter exceeds the predetermined threshold; and
   controlling electrical power to the heater so as to maintain the electrical parameter at the desired value for the electrical parameter.

4. The method of claim 3, wherein the electrical parameter is the resistance of an electrical circuit that includes the heater, and the desired value is a resistance value that is a percentage of the resistance of the electrical circuit that includes the heater determined when the change in the time rate of change of the resistance exceeds the predetermined threshold.

5. A controller for operating a heated fuel injector, said controller comprising:
   a processor and a non-transitory computer memory containing instructions that when executed cause the processor to perform a method comprising the steps of
   applying power to a heater,
   determining a value for an electrical parameter that varies as a function of the temperature of the heater,
   determining a value representative of the time rate of change of the electrical parameter,
   determining a value of the electrical parameter corresponding to a change in the time rate of change of the electrical parameter, wherein said change in the time rate of change of the electrical parameter exceeds a predetermined threshold, and
   controlling electrical power applied to the heater so as to maintain the temperature of the heater about a target temperature that is a predetermined level below the heater temperature at the time at which said change in the time rate of change of the electrical parameter exceeds the predetermined threshold.

6. The controller in accordance with claim 5, wherein the electrical parameter that varies as a function of the temperature of the heater is the resistance of an electrical circuit that includes the heater.

7. The controller in accordance with claim 5, wherein the step of controlling electrical power applied to the heater so as to maintain the temperature of the heater about a target temperature comprises the steps of:
   calculating a desired value for the electrical parameter, wherein said desired value is based on the value of the electrical parameter when the change in the time rate of change of the electrical parameter exceeds the predetermined threshold; and
   controlling electrical power to the heater so as to maintain the electrical parameter at the desired value for the electrical parameter.

8. The controller in accordance with claim 7, wherein the electrical parameter is the resistance of an electrical circuit that includes the heater, and the desired value is a resistance value that is a percentage of the resistance of the electrical circuit that includes the heater determined when the change in the time rate of change of the resistance exceeds the predetermined threshold.

\* \* \* \* \*